(12) United States Patent
Haswell et al.

(10) Patent No.: US 12,530,181 B2
(45) Date of Patent: Jan. 20, 2026

(54) TRAINING AN AGENT-BASED HEALTHCARE ASSISTANT MODEL

(71) Applicant: INTERNATIONAL BUSINESS MACHINES CORPORATION, Armonk, NY (US)

(72) Inventors: Darrel Haswell, Austin, TX (US); Jeb R. Linton, Manassas, VA (US); Khoa Dang Hyunh, Round Rock, TX (US); Newton E Bosworth, Round Rock, TX (US); Jonathan Samn, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 504 days.

(21) Appl. No.: 16/903,851

(22) Filed: Jun. 17, 2020

(65) Prior Publication Data
US 2021/0397427 A1    Dec. 23, 2021

(51) Int. Cl.
*G06F 8/65*     (2018.01)
*A61B 5/00*    (2006.01)
(Continued)

(52) U.S. Cl.
CPC ............ *G06F 8/65* (2013.01); *A61B 5/02055* (2013.01); *A61B 5/14532* (2013.01);
(Continued)

(58) Field of Classification Search
CPC ... G06F 8/65; A61B 5/02055; A61B 5/14532; A61B 5/14542; A61B 5/318;
(Continued)

(56) References Cited

U.S. PATENT DOCUMENTS

| 8,706,464 B2 | 4/2014 | Shusterman |
| 10,332,639 B2 | 6/2019 | Smurro |

(Continued)

FOREIGN PATENT DOCUMENTS

| CN | 104504297 A | 4/2015 |
| CN | 106175726 A | 12/2016 |

(Continued)

OTHER PUBLICATIONS

McMahan et al., "Federated Learning: Collaborative Machine Learning without Centralized Training Data", https://ai.googleblog.com/2017/04/federated-learning-collaborative.html, Google AI Blog, Apr. 6, 2017, 3 pages.

(Continued)

*Primary Examiner* — Peter H Choi
(74) *Attorney, Agent, or Firm* — Gavin Giraud; Andrew D. Wright; Calderon Safran & Wright P.C.

(57) ABSTRACT

Systems and methods for training an agent-based assistant model are provided. In embodiments, a method includes: obtaining biometric data of a user from a software application utilizing an assistant model that determines functions of the software application; filtering the biometric data based on predetermined categories, thereby extracting select biometric data; training a first version of the assistant model based on the select biometric data, thereby generating an updated assistant model; generating a summary of changes including changes to the first version of the assistant model that occurred during the training; and sending the summary of changes to a remote federated learning server, wherein the federated learning server trains a general version of the assistant model based on the summary of changes and other summary of changes received from computing devices of other users, thereby generating an updated general version of the assistant model.

20 Claims, 5 Drawing Sheets

(51) Int. Cl.

| | |
|---|---|
| *A61B 5/0205* | (2006.01) |
| *A61B 5/021* | (2006.01) |
| *A61B 5/024* | (2006.01) |
| *A61B 5/0533* | (2021.01) |
| *A61B 5/145* | (2006.01) |
| *G06N 5/04* | (2023.01) |
| *G06N 20/20* | (2019.01) |
| *G06Q 50/26* | (2024.01) |
| *G16H 10/60* | (2018.01) |
| *G16H 40/67* | (2018.01) |
| *G16H 50/20* | (2018.01) |
| *H04L 9/40* | (2022.01) |

(52) U.S. Cl.
CPC ........ *A61B 5/14542* (2013.01); *A61B 5/4866* (2013.01); *A61B 5/7267* (2013.01); *A61B 5/746* (2013.01); *G06N 5/04* (2013.01); *G06N 20/20* (2019.01); *G16H 10/60* (2018.01); *G16H 40/67* (2018.01); *G16H 50/20* (2018.01); *H04L 63/083* (2013.01); *A61B 5/021* (2013.01); *A61B 5/024* (2013.01); *A61B 5/0533* (2013.01); *G06Q 50/265* (2013.01)

(58) Field of Classification Search
CPC ..... A61B 5/4866; A61B 5/7267; A61B 5/746; A61B 5/021; A61B 5/024; A61B 5/0533; G06N 5/04; G06N 20/20; G06N 3/08; G06N 3/006; G06N 3/0445; G06N 3/0454; G06N 3/044; G06N 3/045; G16H 10/60; G16H 40/67; G16H 50/20; H04L 63/083; H04L 67/12; G06Q 50/265; G06B 5/04

See application file for complete search history.

(56) References Cited

U.S. PATENT DOCUMENTS

| | | | |
|---|---|---|---|
| 11,798,090 B1* | 10/2023 | Nazir | G06N 20/00 |
| 2012/0084092 A1 | 4/2012 | Kozuch et al. | |
| 2017/0032241 A1 | 2/2017 | Corrado et al. | |
| 2019/0012592 A1* | 1/2019 | Beser | G06N 3/08 |
| 2019/0150849 A1* | 5/2019 | Yorke | A61B 5/14551 |
| 2021/0090750 A1* | 3/2021 | Sadilek | G16H 50/30 |
| 2021/0234668 A1* | 7/2021 | Manamohan | H04L 9/30 |

FOREIGN PATENT DOCUMENTS

| | | |
|---|---|---|
| CN | 104484562 B | 3/2018 |
| CN | 108597609 A | 9/2018 |

OTHER PUBLICATIONS

Mancuso, "Privacy-Preserving Machine Learning 2018: A Year in Review", https://medium.com/dropoutlabs/privacy-preserving-machine-learning-2018-a-year-in-review.html, Droput Labs, Jan. 10, 2019, 3 pages.

Anonymous, "Model Training", https://elitedatascience.com/model-training, ELITE Data Science Primer, accessed May 24, 2020, 5 pages.

Anonymous, "MSP Implementation with Identity Mixer", https://hyperledger-fabric.readthedocs.io/en/release-1.3/idemix.html#what-is-idemix, Hyperledger, accessed Jun. 11, 2020, 8 pages.

Anonymous, "BERT (language model)", https://en.wikipedia.org/wiki/BERT_(language_model), Wikipedia, accessed May 27, 2020, 2 pages.

Mell et al., "The NIST Definition of Cloud Computing", NIST, Special Publication 800-145, Sep. 2011, 7 pages.

Chen et al., "Ekiden: A Platform for Confidentiality-Preserving, Trustworthy, and Performant Smart Contract Execution", Aug. 27, 2019, 20 pages.

Tramèr et al., "Slalom: Fast, Verifiable and Private Execution of Neural Networks in Trusted Hardware", Published as a conference paper at ICLR, Feb. 27, 2019, 19 pages.

* cited by examiner

TRAINING AN AGENT-BASED HEALTHCARE ASSISTANT MODEL

BACKGROUND

Aspects of the present invention relate generally to training machine learning models and, more particularly, to training an agent-based healthcare assistant model.

Various neural network architectures have been created to collect and analyze data over a cloud network. Attention-based deep neural network architectures enable the building of predictive models based on time-series data such as natural language and music. One example of a deep neural network architecture is a Transformer, a deep machine learning model used primarily in the field of natural language processing (NLP). Like recurrent neural networks (RNNs), Transformers are designed to handle ordered sequences of data, such as natural language, for various tasks such as machine translation and text summarization.

Federated learning (collaborative learning) is a machine learning technique that trains an algorithm or model across multiple decentralized edge devices or servers holding local data samples, without exchanging their data samples. This approach is different from traditional centralized machine learning techniques where all data samples are uploaded to one server. Federated learning enables multiple actors to build a common learning model without sharing data, thus addressing issues of data privacy, data security, and data access rights, for example.

Wearable devices have gained popularity in recent times, and may be utilized to collect user data from various sensors such as biometric sensors, accelerometers, gyroscopes, magnetometers, barometric pressure sensors, ambient temperature sensors, global positioning systems (GPS), etc. Various model-driven software applications have been created for use on such wearable devices. For example, various model-driven software applications have been created which utilize data from sensors of the wearable device to determine the performance of various functions, such as user alerts, etc. In general, a model-driven application is a software application wherein functions or behaviors of the application are based on, or in control of, an evolving applied model.

SUMMARY

In a first aspect of the invention, there is a computer-implemented method including: obtaining, by a computing device, biometric data of a user from a software application utilizing an assistant model that determines functions of the software application; filtering, by the computing device, the biometric data based on predetermined categories, thereby extracting select biometric data; training, by the computing device, a first version of the assistant model based on the select biometric data, thereby generating an updated assistant model; generating, by the computing device, a summary of changes including changes to the first version of the assistant model that occurred during the training; and sending, by the computing device, the summary of changes to a remote federated learning server, wherein the federated learning server trains a general version of the assistant model based on the summary of changes and other summary of changes received from computing devices of other users, thereby generating an updated general version of the assistant model.

In another aspect of the invention, there is a computer program product including one or more computer readable storage media having program instructions collectively stored on the one or more computer readable storage media. The program instructions are executable to: obtain biometric data of a user from a software application, the software application utilizing an assistant model that defines functions of the software application; filter the biometric data based on predetermined categories, thereby extracting select biometric data; train a first version of the assistant model based on the select biometric data, thereby generating an updated assistant model; generate a summary of changes including changes to the first version of the assistant model that occurred during the training; authenticate the user with a remote federated learning server using privacy-preserving authentication; tag the summary of changes with a security token obtained from the federated learning server during the authentication; and send the summary of changes to the federated learning server, and wherein the federated learning server trains a general version of the assistant model based on the summary of changes and other summary of changes received from computing devices of other users, thereby generating an updated general version of the assistant model.

In another aspect of the invention, there is system including a processor, a computer readable memory, one or more computer readable storage media, and program instructions collectively stored on the one or more computer readable storage media. The program instructions are executable to: obtain biometric data of a user from a software application, the software application utilizing an assistant model that defines functions of the software application; filter the biometric data based on predetermined categories, thereby extracting select biometric data; train a first version of the assistant model based on the select biometric data, thereby generating an updated assistant model; generate a summary of changes including changes to the first version of the assistant model that occurred during the training; send the summary of changes to the federated learning server, wherein the federated learning server updates a general version of the assistant model based on the summary of changes and other summary of changes received from computing devices of other users, thereby generating an updated general version of the assistant model; and obtain the updated general version of the assistant model from the federated learning server.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
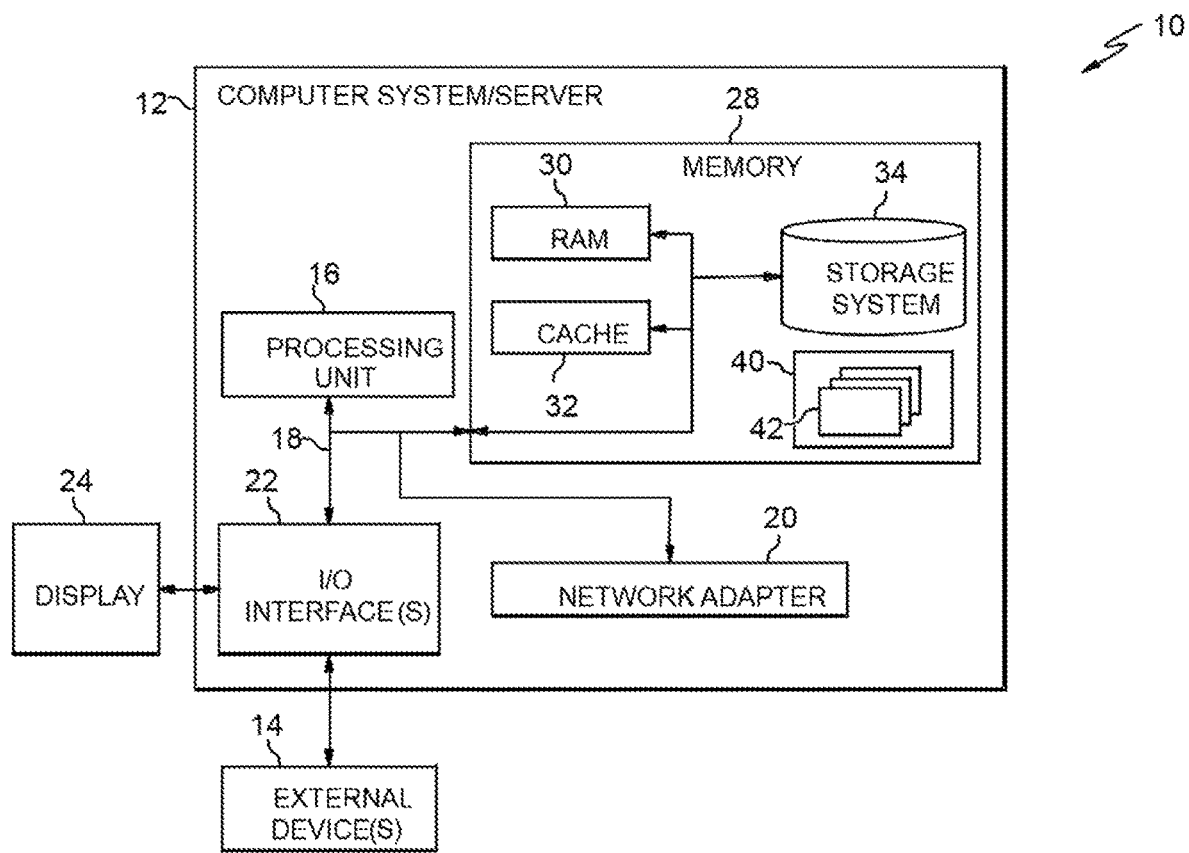
FIG. 1 depicts a cloud computing node according to an embodiment of the present invention.

Aspects of the present invention relate generally to training machine learning models and, more particularly, to training an agent-based healthcare assistant model. In embodiments, data is collected from healthcare monitoring devices (user devices), and sent (e.g., streamed) to an agent associated with the respective healthcare monitoring devices. The agent participates in distributed transfer learning coordinated by a cloud service (e.g., a federated learning service) to train/update a model based on the collected data, wherein the data is anonymized. In embodiments, the data is streamed to the agent, which authenticates to the cloud service using a privacy-preserving authentication method.

In embodiments, an intelligent agent-based healthcare assistant software application is based on a predictive attention-based deep neural network (e.g., model). The agent makes use of a general model trained through federated learning on hundreds or thousands of streams of individuals' healthcare statistics from wearable devices such as smart watches, which are strongly anonymized. Optionally, the general model is fine-tuned or customized to an individual user using transfer learning in the agent, and the fine-tuned model is downloaded from the user's agent to their user device (e.g., wearables and/or smart phones). In implementations, the fine-tuned model on the user device performs useful classifications of the user's current state of health and exercise, performs predictions of future health states and events, and/or alerts the user or healthcare providers in case of an imminent or current health crisis. In embodiments, some graphics processing unit (GPU) or similar hardware is utilized for more efficient training, both for federated learning to participate in the creation of the general model and for transfer learning to fine-tune the general model to a particular user's healthcare data (e.g., biometric data from measurement sensors).

In implementations, the agent resides locally with respect to the user in an internet-of-things (IoT) or edge-computing host device, in the form of a container. The term container as used herein refers to a standard unit of software that packages up code and its dependencies so that the application runs quickly and reliably from one computing environment to another. In alternative embodiments, the agent resides in the user's smartphone or on a cloud-based device, in an application, on a server less software-as-a-service (SaaS), or in a virtual machine (VM).

In embodiments, the healthcare data is streamed to an agent, which authenticates to the cloud service using a privacy-preserving authentication method. In implementations, each user is issued a unique persistent token upon first authentication, which is used as a metadata element to tag the data streams to be associated with them. In aspects, the user has an option to destroy or replace the token at any time, or to dissociate his or her data streams from each other using multiple tokens in order to limit the linkability of the data to the user, in order to enhance privacy.

The recent proliferation of wearable healthcare devices such as smartwatches with various sensors now generates massive quantities of health-relevant time-series data, most of which is inaccessible to general data science because of privacy concerns. Advancements in deep learning tools make it possible to train a deep neural network on data from many contributors while maintaining robust privacy of individuals contributing the training data.

Advantageously, embodiments of the invention provide technical improvements in the field of deep neural network training. For example, new functionality is introduced to an agent enabling the agent to provide filtered anonymized healthcare data to a federated learning server for collaborative training of a general model, as well as functionality enabling the agent to provide filtered user-specific data for customization of the general model at the agent level.

It should be understood that, to the extent implementations of the invention collect, store, or employ personal information provided by, or obtained from, individuals (for example, health-related data), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
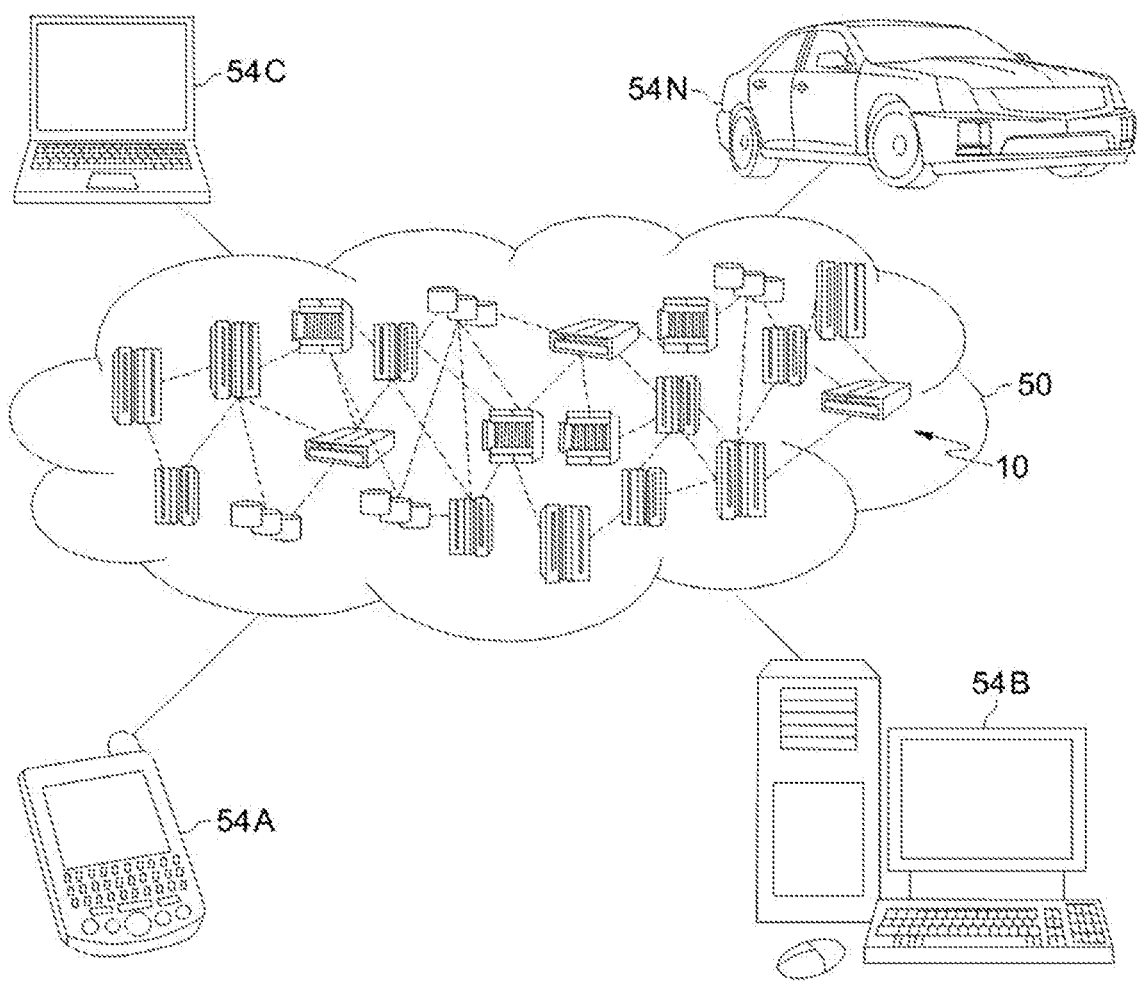
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
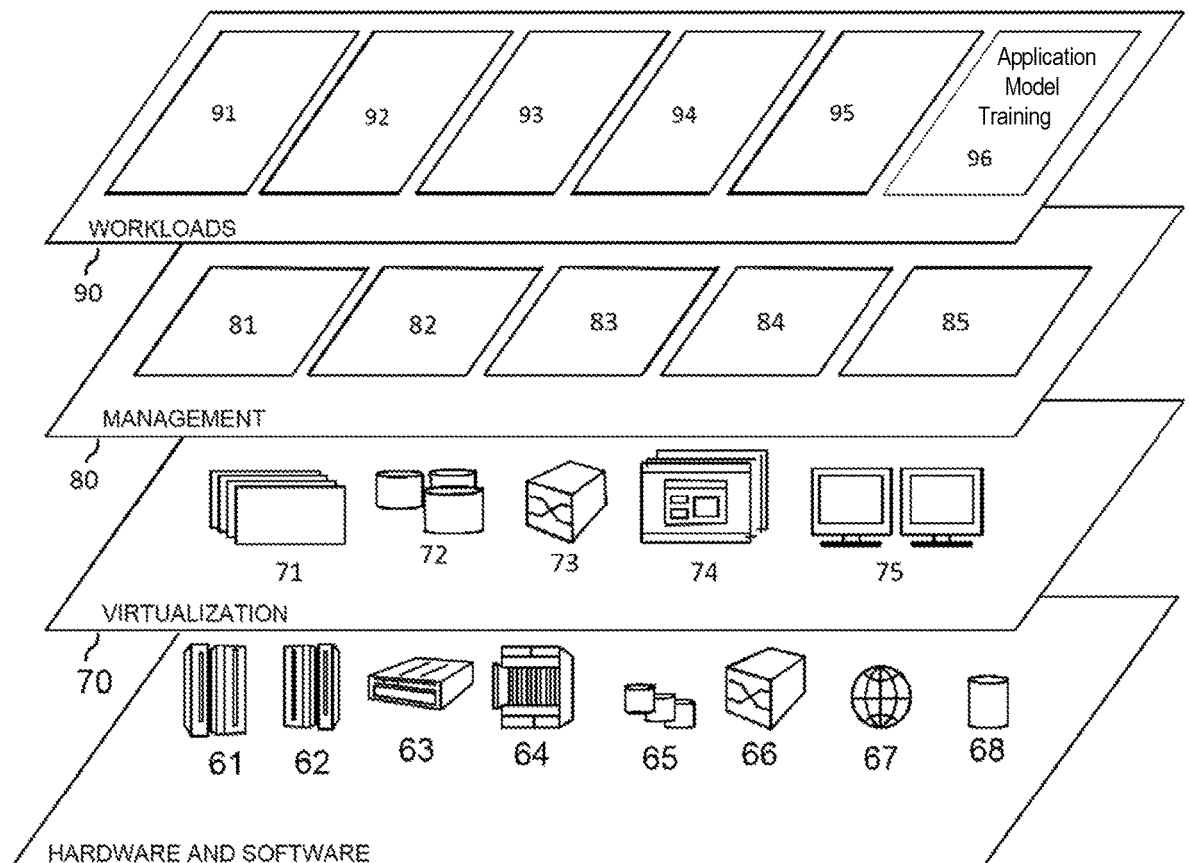
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application model training 96.

Implementations of the invention may include a computer system/server 12 of FIG. 1 in which one or more of the program modules 42 are configured to perform (or cause the computer system/server 12 to perform) one of more functions of the application model training 96 of FIG. 3. For example, the one or more of the program modules 42 may be configured to: obtain healthcare data (e.g., biometric data) from one or more user devices of a user; filter the healthcare data to extract select healthcare data based on predetermined categories relevant to a general population of users; update a first version of an assistant model to generate an updated assistant model based on the select healthcare data; generate summary of changes data including changes made to the first version of the assistant model; authenticate the user to a remote federated learning server and obtain a security token; tag the summary of changes with the security token, and send the summary of changes to the federated learning server for use in cooperative training of a general assistant model in a cloud environment.

Figure 4:
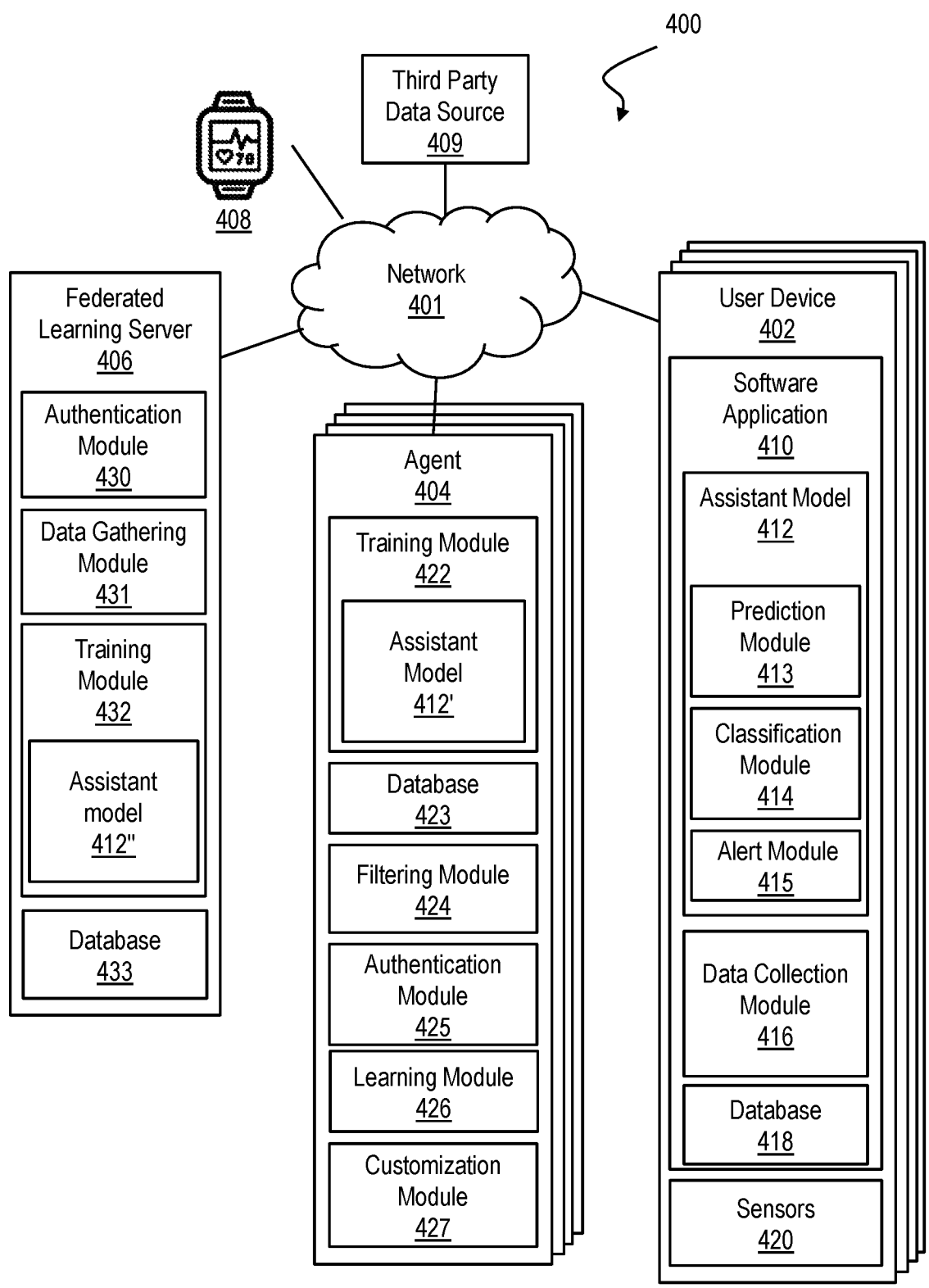
FIG. 4 shows a block diagram of an exemplary environment in accordance with aspects of the invention.

FIG. 4 shows a block diagram of an exemplary environment 400 in accordance with aspects of the invention. In embodiments, the environment 400 includes a network 401 interconnecting one or more of: a plurality of user devices represented by user device 402, one or more agents represented by agent 404, a federated learning server 406, one or more wearable devices represented by smartwatch 408 and one or more third party data sources represented at 409.

The network 401 may be any suitable communication network or combination of networks, such as a local area network (LAN), a general wide area network (WAN), and/or a public network (e.g., the Internet). In embodiments, the user device 402, agent 404, federated learning server 406 and/or smartwatch 408 comprise cloud computing nodes 10 within the cloud computing environment 50 of FIG. 2.

In implementations, the user device 402 includes one or more components of the computer system 12 of FIG. 1, and may be a personal computing device of a user such as a smartphone, smartwatch, desktop computer, laptop computer, tablet computer, etc. In aspects, the user device 402 may be in communication with other users devices of a user, such as a smartwatch 408 of the user. In embodiments, the user device 402 comprises one or more program modules, such as program modules 42 described with respect to FIG. 1. In implementations, user device 402 includes one or more of the following (which may comprise program modules 42): a software application (e.g., healthcare application 410, an assistant model (e.g., healthcare assistant model) 412, a prediction module 413, a classification module 414, an alert module 415, a data collection module 416, a database 418, and one or more sensors 420. In embodiments, the healthcare application 410 is a software application including the assistant model 412, which is configured to provide functionality to the user device 402 based on healthcare data of the user. In aspects, the assistant model 412 includes the prediction module 413 configured to generate predictions based on the healthcare data of the user, the classification module 414 configured to classify the healthcare data of the user, and the alert module 415 configured to determine and generate alerts based on the healthcare data. In implementations, the assistant model 412 defines rules utilized by the prediction module 413, classification module 414 and alert module 414 for performing functions (e.g., rules for generating alerts based on healthcare data of the user).

In implementations, the data collection module 416 is configured to collect healthcare data of a user of the user device 402, and save the data in the database 418. In aspects, the healthcare data includes manually inserted data of a user, data obtained from an outside or third party source (e.g., the smartwatch 408), and/or sensor data from sensors 420 of the user device 402. In embodiments, the user device 402 houses a healthcare application 420 configured to obtain healthcare data of a user and analyze the healthcare data utilizing an assistant model 412. In implementations, the sensors 420 are configured to provide healthcare data of a user to the healthcare application 410, such as pulse data, electrocardiogram data, blood oxygen data, blood sugar data, blood pressure data, metabolism data, body temperature data, galvanic skin response data, and manually entered user status data (e.g., subjective pain level).

In implementations, the agent 404 includes one or more components of the computer system 12 of FIG. 1, and may be a computing device of a user such as an internet-of-things (JOT) device or an edge-computing host device (e.g., wireless home assistant device), which is separate from the user device 402 housing the healthcare application 410 as depicted in FIG. 4. Alternatively, the agent 404 may comprise a program module (e.g., program modules 42) of the user device 402. In embodiments, the agent 404 comprises one or more program modules, such as program modules 42 described with respect to FIG. 1. In implementations, agent 404 includes one or more of the following (which may comprise program modules 42): a training module 422, an assistant model 412', a database 423, a filtering module 424, an authentication module 425, a learning module 426, and a customization module 427. In embodiments, the training module 422 is configured to obtain healthcare data from the user device 402 (e.g., from the database 418), obtain contextual information associated with the healthcare data, update an assistant model to obtain an updated assistant model based on at least some of the healthcare data (and optionally the contextual information), generates a summary of changes to the assistant model, and sends the summary of changes to the federated learning server 406. In aspects, the agent 404 stores the healthcare data in the database 423. In aspects, the assistant model 412' is an updated/amended version of the assistant model 412 of the user device 402 generated by the training module 422. In implementations, the training module 422 obtains the assistant model 412 from the user device 402 to generate the updated assistant model 412'.

In embodiments, the filtering module 424 is configured filter the healthcare data of the user to extract select healthcare data based on predetermined categories, wherein the predetermined categories include healthcare data relevant to a general population of users of the healthcare application. In implementations, the predetermined categories comprise threshold values, wherein healthcare data is filtered based on values of the data meeting the predetermined threshold values. The agent 404 may obtain the predetermined rules from a third party provider (e.g., provider of the healthcare application 410), and/or may obtain the predetermined rules from a user via a graphical user interface enabling a user to select the predetermined rules. In this way, the agent 404 may differentiate between healthcare data that is relevant to a general population that utilizes the healthcare application 410, and healthcare data that is relevant to a specific user.

In embodiments, the authentication module 425 is configured to perform authentication of the user or agent 404 to the federated learning server 406, obtain a security token from the federated learning server 406 for use in communicating healthcare model updates to the federated learning server 406. In aspects, the learning module 426 is configured to determine, based on the select healthcare data obtained from the filtering module 424, updates to the assistant model 412, initiate the updates to the assistant model 412 to generate the updated assistant model 412', generate a summary of the changes to the assistant model 412, tag the summary of changes with the security token, and send the tagged summary of changes to the federated learning server 406.

In aspects, the learning module 426 utilizes machine learning tools to determine and implement updates to the assistant model 412. In embodiments, the learning module 426 utilizes transfer learning, which is a machine learning tool that focuses on storing knowledge gained while solving one problem and applying it to a different but related problem. Various machine learning model training tools may be utilized by the learning module 426 to determine and generate updates for the assistant model 412, and the present invention is not intended to be limited to a particular machine learning training process. In implementations, the learning module 426 determines changes/updates to be made to the prediction module 413, the classification module 414 and/or alert module 415 of the assistant model 412.

In embodiments, the customization module 427 is configured to obtain a general assistant model 412" from the federated learning server 406, and customize the general assistant model 412" to produce a customized assistant model based on the healthcare data of the user. In implementations, the filtering module 424 filters the healthcare data based on predetermined customization rules to obtain healthcare data relevant to customization of the healthcare application 410 to the user. In implementations, the predetermined categories to filter for healthcare data relevant to a general population of users are different from the predetermined customization rules to filter for healthcare data relevant to customization of the healthcare application to a particular user.

In implementations, the federated learning server 406 includes one or more components of the computer system 12 of FIG. 1, and may be a special computing device configured to obtain healthcare data from multiple (e.g., hundreds) of users for use in generating an improved general assistant model. In embodiments, the federated learning server 406 comprises one or more program modules, such as program modules 42 described with respect to FIG. 1. In implementations, federated learning server 406 includes one or more of the following (which may comprise program modules 42): an authentication module 430, a data gathering module 431, a training module 432 and a general assistant model 412".

In embodiments, the authentication module 430 is configured to authenticate a user (e.g., agent 404) and provide the user with a security token, receive summary of changes notification tagged with the security token, and verify the source of the summery of changes notification based on the security token. In aspects, the data gathering module 431 is configured to obtain the summary of changes data from multiple users (e.g., hundreds of users) within the environment 400, and store the data in a database 433. In embodiments, each summary of changes notification excludes any original healthcare data of a user, and excludes any user identification (ID) data (e.g., user ID, phone number, or other personal data) which is capable of being utilized to determine a source of the data.

In implementations, the training module 432 is configured to utilize machine learning tools to determine updates to the assistant model 412 (or versions thereof), and updating the assistant model 412 to generate a general assistant model 412" with improved functionality based on the summary of changes data (e.g., hundreds of summary of changes notifications). In aspects, the training module 432 provides the general assistant model 412" to the agent 404 or the user device 402. As noted above, in embodiments, the agent 404 obtains the general assistant model 412" from the federated learning server 406, customizes the general assistant model 412" to generate a customized assistant model, and provides the customized assistant model to the user device 402 for use by the healthcare application 410.

The third party data source 409 may include one or more components of the computer system 12 of FIG. 1, and may be a special computing device configured to provide data to one or more clients in the environment 400. In embodiments, the third party data source 409 comprises one or more of: a source for weather data, and a source of prescription drug or pharmaceutical data.

The user device 402, the agent 404, the federated learning server 406 and the smartwatch 408 may each include additional or fewer components/modules than those shown in FIG. 4. In embodiments, separate modules may be integrated into a single module. Additionally, or alternatively, a single module may be implemented as multiple modules. Moreover, the quantity of devices and/or networks in the environment 400 is not limited to what is shown in FIG. 4. In practice, the environment 400 may include additional devices and/or networks; fewer devices and/or networks; different devices and/or networks; or differently arranged devices and/or networks than illustrated in FIG. 4.

Figure 5:
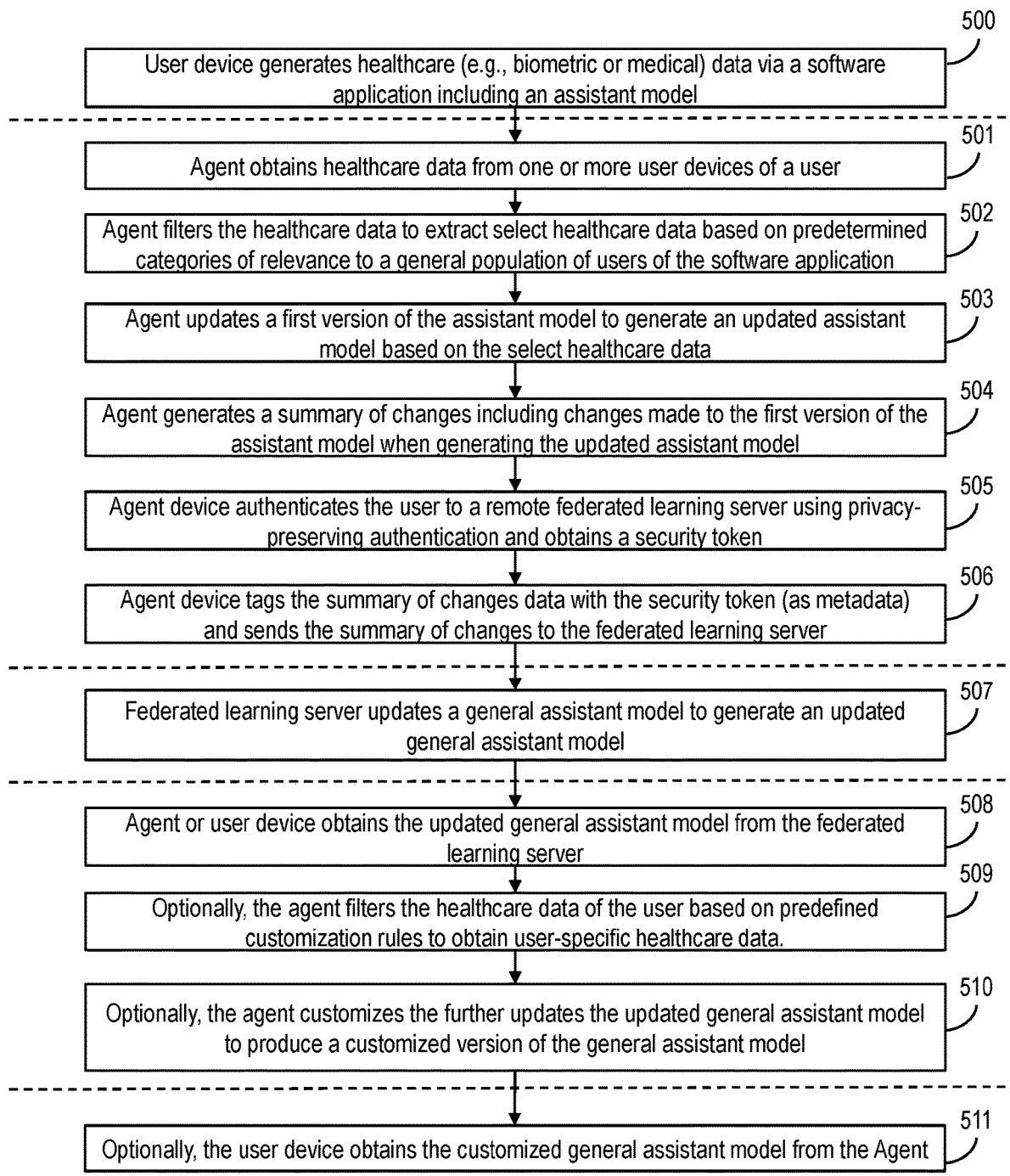
FIG. 5 shows a flowchart of an exemplary method in accordance with aspects of the invention.

FIG. 5 shows a flowchart of an exemplary method in accordance with aspects of the present invention. Steps of the method may be carried out in the environment of FIG. 4 and are described with reference to elements depicted in FIG. 4.

At step 500, the user device 402 generates healthcare data (e.g., biometric data from measurement sensors) of a user through the healthcare application 410 utilizing the assistant model 412 of the healthcare application 410. Healthcare data may include sensor data from one or more measurement sensors 420. For example, the healthcare data may include biometric data of a user including: pulse data, electrocardiogram data, blood oxygen data, blood sugar data, blood pressure data, metabolism data, body temperature data, galvanic skin response data, and/or manually entered user status data, for example. The healthcare data may include context data associated with biometric data, such as a time or date associated with the collection of biometric measurement data from the sensors 420.

At step 501, the agent 404 obtains the healthcare data of the user generated at step 500 from the user device 402. The agent 404 may be part of the user device 402 or may be remote from the user device 402 (e.g., a voice-activated personal assistant device). In implementations, the agent 404 is associated with more than one user device 402 of a user (e.g., a smartwatch and a heart monitor, etc.), and may obtain healthcare data from more than one user device 402 of the user at step 501. Optionally, the agent 404 also obtains contextual information associated with the healthcare data, such as time of day the healthcare data is collected, current weather at the time the data was collected, pollen count for a location of the user at a specific time or period of time, the day of the week (e.g., a workday, a weekend, a holiday, etc.) associated with healthcare data, etc. The agent 404 may obtain the contextual information from the user device 402 and/or from the third party data source 409 (e.g., a weather data source). In embodiments, the training module 422 of the agent 404 implements step 501.

At step 502, the agent 404 filters the healthcare data to extract select healthcare data based on predetermined categories, wherein the predetermined categories include healthcare data relevant to a general population of users of the healthcare application 410. In implementations, the predetermined categories are obtained from a provider of the healthcare application 410. In embodiments, the healthcare data relevant to the general population is different from healthcare data utilized to customize the healthcare application 410 based on user-specific healthcare data of the user. In embodiments, the predetermined categories include healthcare parameters that meet or exceed a predetermined threshold value. In one example, the healthcare data is determined to be relevant to the general population when the healthcare parameter is utilized or accessed by more than a predetermined percentage of users of the healthcare application 410. In embodiments, the filtering module 424 of the agent 404 implements step 502.

At step 503, the agent 404 trains (updates) a first version of the assistant model (e.g., assistant model 412) to generate an updated assistant model 412' based on the select healthcare data. In embodiments, the agent 404 utilizes machine learning (ML) techniques to train the assistant model and generate the assistant model 412'. ML training techniques may include supervised learning and unsupervised learning techniques. Various ML training techniques may be utilized, and the present invention is not limited to particular ML techniques utilized to generate the updated assistant model 412'. In embodiments, the agent 404 recognizes a pattern of the select healthcare data, and updates the assistant model 412 based on the select healthcare data. In one example, the select healthcare data includes data regarding a user alert utilized by a predetermined number of users of the healthcare application 410 (e.g., utilized by the more than 60% of users). In this example, the select healthcare data indicates that the user always ignores a certain alert, and the agent 404 determines to change rules associated with issuing the alert based on the user always ignoring the alert. In embodiments, the training module 422 of the agent 404 implements step 503 based on the select healthcare data received from the filtering module 424.

At step 504, the agent 404 generates a summary of changes including changes to the first version of the assistant model that occurred during the updating at step 503. In one example, the summary of changes lists a change to rules associated with the healthcare application 410 issuing an alert. In implementations, the summary of changes also includes contextual data obtained at step 501. In embodiments, the training module 422 of the agent 404 implements step 504.

At step 505, the agent 404 authenticates the user to the remote federated learning server 406 using privacy-preserving authentication protocols, and obtains a digital security token from the federated learning server 406 as part of the authentication. The term digital security token as used herein refers to digital data that acts as an electronic key to access data. In embodiments, the security token is a persistent token unique to the user. In implementations, the agent 404 and federated learning server 406 utilize a privacy-preserving authentication method such as Identity Mixer™, a cryptographic protocol suite of International Business Machines Corporation (IBM®), or Sovrin® identification, which is a registered trademark of Sovrin Foundation. In embodiments, each user is issued a unique persistent token upon first authentication, which is used as a metadata element to tag the data streams to be associated with them. In aspects, the user has an option to destroy or replace the token at any time, or to dissociate his or her data streams from each other using multiple tokens in order to limit the linkability of the data to the user, in order to enhance privacy. Various authentications tools and methods may be utilized by the agent 404, and the present invention is not intended to be limited to a particular method discussed herein. In embodiments, the authentication module 425 of the agent 404 implements step 505.

At step 506, the agent 404 tags the summary of changes with the digital security token (e.g., as metadata) and sends the summary of changes to the federated learning server 406. In implementations, the summary of changes does not include any identifying information of the user (the data is anonymized). The summary of changes may be sent periodically or continuously as a steam of data as changes are made to the first version of the assistant model (e.g., assistant model 412) at the agent 404. In embodiments, the authentication module 425 of the agent 404 implements step 506.

At step 507, the federated learning server 406 trains (updates) a general assistant model (e.g., the assistant model 412) to generate an updated general assistant model 412" based on the summary of changes of step 506, as well as other summary of changes received from the agents 406 of other users. In implementations, the general assistant model comprises a time-series predictive deep neural network. For example, the general assistant model may be an attention-based deep neural net, or alternatively, a recurrent or convolutional deep neural net, or a future time series predictive network architecture. In embodiments, initial training of the general assistant model is performed using a "self-supervised" loss function definition. Alternately, the initial training may be implemented using a semi-supervised methodology such as manually labeling clusters of data created by an attention-based autoencoder.

In implementations, the authentication module 430 of the federated learning server 406 utilizes the security token associated with the summary of changes to authenticate source of the summary of changes before utilizing the data in the training/updating of the general assistant model. In implementations, the data gathering module 431 collects summary of changes data (anonymized data) from multiple users (via agents of the users), and stores the data in the database 433. In embodiments, the training module 432 implements the training or updating of the general assistant model according to step 507.

In implementations, the federated learning by the training module 432 results in a converged neural net general assistant model, and this backbone model is further trained for two different heads: one for classification of healthcare state (e.g., the classification module 414), and one for prediction of future healthcare states (e.g., the prediction module 413). In implementations, the classification head is trained by manual labeling by data scientists and clinicians. In embodiments, multiple classification labels may be applied at any time to healthcare data by the classification module 414, including states such as: awake and alert; exercising; resting; sleeping (e.g., including sub-tags for type of sleep); over-exertion; mild or acute low blood sugar; hypertensive stress, hypertensive crisis; cardiac event (e.g., including specific subtypes); hyperthermia; hypothermia; shock; or other biophysical or healthcare states. In implementations, the classified healthcare states are tagged by the classification module 414 as normal, abnormal and/or critical. In embodiments, during training, the federated learning server 406 associates abnormal or critical states of a user with alerts to the user in an alert module 415, and optionally sends alerts to others designated by the user.

In embodiments, the classification head is configured to be applied both to the direct output of the user devices 402 applied for inference on the current healthcare state of a respective user, and to the predictive output of the user devices 402 (e.g., several minutes into the future) based on current healthcare data inputs (e.g., sensor data of the user devices 402). In such embodiments, the assistant model 412" trained by the federated learning server 406 is configured to classify both the actual current state of the user and the predicted future state of the user based on information through the current moment. In aspects, the predictive horizon is settable by the user (e.g., between five and 60 minutes into the future). For example, user selectable options may be made available to a user through the user device 402 and/or the agent 404 to select time periods for the prediction features of the healthcare application 410. Optionally, the assistant model (e.g., assistant model 412") can be set to predict the state at multiple time horizons (e.g., five minutes into the future as well as one hour into the future).

In implementations, once trained, the general assistant model 412" is made available for download from the cloud (federated learning server 406) by all participant users, and optionally, other subscribers who do not contribute healthcare data to the federated learning server 406 for model training purposes. In embodiments, the assistant model 412" is downloaded by the agent 404 or the user device 402 (e.g., wearable device or smartphone). In implementations, users may opt in (e.g., by default) and may opt out to private/anonymous use of their healthcare data and contribute to the federated learning-based update of the general assistant model on an ongoing basis.

In implementations, at step 508 the agent 404 obtains (downloads) the updated general assistant model 412" from the federated learning server 406. Alternatively, the user device 402 obtains the updated general assistant model 412" from the federated learning server 406 at step 508.

Optionally, at step 509, the agent 404 filters the healthcare data of the user received from the user device 402, based on predefined customization rules to obtain user-specific healthcare data. In embodiments, a user can choose an option (e.g., via an interface of a smartphone of the user) to customize the healthcare application 410 by fine-tuning the general healthcare assist model 412" at the agent 404. In embodiments, the filtering module 424 of the agent 404 implements step 509.

At step 510, the agent 404 further trains (updates) the updated general assistant model 412" to produce a fine-tune or customized version of the updated general assistant model 412" based on the user-specific healthcare data, wherein the customized version of the updated general assistant model 412" is different from the updated general model 412". Various training/updating tools and methods may be utilized by the agent 404 in the implementations of step 510. In aspects, the customization is performed using transfer learning methods and tools at the agent 404. In embodiments, the customization module 427 of the agent 404 implements step 510.

In embodiments, at step 511, the agent 404 provides the customized general assistant model to the one or more user devices 402 of the user for use by the healthcare application 410, wherein the assistant model 412 is updated based on or replaced with the customized general assistant model, including the prediction module 413, classification module 414 and/or alert module 415. In alternative embodiments, at step 511, the agent 404 is part of the user device 402 and replaces the assistant model 412 with the customized general assistant model, wherein the healthcare application 410 performs functions based on the customized general assistant model.

Based on the above, it can be understood that implementations of the invention are configured to collect anonymized individual data from hundreds or thousands of users, and utilize the data to train a general assistant model for use by user devices of the users. According to implementations described above, the user's personal or sensitive healthcare data never needs to leave the agents of the respective users, and the trained general assistant model is regularly updated and available for download from the cloud by the agents. Optionally, the agents may fine-tune or customize the general assistant model based on the respective user's personal healthcare history (e.g., using transfer learning). In aspects, the trained general assistant model performs both classification and prediction, and can be utilized by the user devices to provide the users with both the current state of the user and predict when an adverse healthcare event is likely in the future.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
obtaining, by a computing device, healthcare data of a user, including sensor data, from a software application utilizing an assistant model that determines functions of the software application;
filtering, by the computing device, the healthcare data of the user based on predetermined categories of data relevant to a general population of users, thereby extracting a first subset of the healthcare data of the user, wherein the predetermined categories of data relevant to a general population are selected as data relevant to the general population based on healthcare parameters that are utilized by more than a predetermined percentage of the general population of users of the software application;
training, by the computing device, a first version of the assistant model using the first subset of the healthcare data of the user, thereby generating an updated assistant model;
generating, by the computing device, a summary of changes including changes to the first version of the assistant model that occurred during the training;
authenticating, by the computing device, the user with a remote federated learning server using privacy-preserving authentication and obtaining a security token from the federated learning server as part of the authentication;
tagging, by the computing device, the summary of changes with the security token as metadata;
sending, by the computing device, the summary of changes to the federated learning server, wherein the federated learning server trains a general version of the assistant model based on the summary of changes and other summary of changes received from first computing devices of the general population of users, thereby generating an updated general version of the assistant model;
obtaining, by the computing device, the updated general version of the assistant model from the federated learning server;
customizing, by the computing device, the updated general version of the assistant model for the user by training the updated general version of the assistant model using a second subset of the healthcare data of the user different from the first subset of the healthcare data of the user, thereby generating a customized version of the assistant model; and
sending, by the computing device, the customized version of the assistant model to second computing devices of the user for use by the software application, wherein the customized version of the assistant model comprises a prediction module configured to generate predictions based on the healthcare data of the user at the second computing devices of the user.

2. The method of claim 1,
wherein the summary of changes does not include any identifying information of the user and includes context data associated with the healthcare data of the user including when the healthcare data of the user was collected.

3. The method of claim 1, further comprising:

filtering, by the computing device, the healthcare data of the user, including the sensor data, based on predefined customization rules, thereby obtaining user-specific healthcare data, wherein the sensor data is obtained from biometric sensors, accelerometers, and global positioning systems (GPS), wherein the predefined customization rules are relevant to the user and are different from the predetermined categories, and the customized version of the assistant model is different from the updated general version of the assistant model;

receiving, by the computing device, updated healthcare data of the user comprising updated sensor data;

training, by the computing device, the updated general version of the assistant model based on the updated healthcare data of the user; and sending, by the computing device, an updated customized version of the assistant model to the second computing devices of the user for use by the software application, wherein the updated customized version of the assistant model replaces a previous version of the assistant model on the second computing devices of the user.

4. The method of claim 3, wherein the assistant model is replaced with the customized version of the assistant model and the software application performs functions based on the customized version of the assistant model and wherein the customized version of the assistant model is customized for a user based on user-specific healthcare data.

5. The method of claim 3, wherein the computing device comprises a user device housing the software application, and the method further comprises replacing, by the computing device, the assistant model with the customized version of the assistant model, wherein the software application performs functions based on the customized version of the assistant model.

6. The method of claim 1, wherein the obtaining the healthcare data of the user comprises obtaining the healthcare data from one or more remote user devices of the user operating the prediction model configured to generate predictions based on the healthcare data of the user and wherein the sensor data comprises data from a plurality of sensors.

7. The method of claim 1, wherein the computing device is selected from the group consisting of: an internet-of-things (IOT) device, and an edge-computing host device.

8. The method of claim 1, wherein the healthcare data is selected from at least one of the group consisting of: pulse data, electrocardiogram data, blood oxygen data, blood sugar data, blood pressure data, metabolism data, body temperature data, galvanic skin response data, and manually entered user status data.

9. The method of claim 1, wherein the assistant model performs classifications of the healthcare data, predictions based on the healthcare data, and generates alerts based on the healthcare data exceeding a predetermined threshold.

10. The method of claim 1, wherein the computing device includes software provided as a service in a cloud environment.

11. A computer program product comprising one or more computer readable storage media having program instructions collectively stored on the one or more computer readable storage media, the program instructions executable to:

obtain healthcare data, including sensor data, of a user from a software application, the software application utilizing an assistant model that defines functions of the software application;

filter the healthcare data based on predetermined categories relevant to a general population of users, thereby extracting a first subset of the healthcare data, wherein the predetermined categories of data relevant to a general population are selected as data relevant to the general population based on healthcare parameters that are utilized by more than a predetermined percentage of the general population of users of the software application;

train a first version of the assistant model based on the first subset of the healthcare data, thereby generating an updated assistant model;

generate a summary of changes including changes to the first version of the assistant model that occurred during the training and to contextual data associated with the healthcare data;

authenticate the user with a remote federated learning server using privacy-preserving authentication and obtain a security token from the federated learning server as part of the authentication;

tag the summary of changes with the security token as metadata;

send the summary of changes to the federated learning server, and wherein the federated learning server trains a general version of the assistant model based on the summary of changes and other summary of changes received from first computing devices of the general population of users, thereby generating an updated general version of the assistant model;

obtain the updated general version of the assistant model from the federated learning server;

customize the updated general version of the assistant model for the user by training the updated general version of the assistant model using a second subset of the healthcare data of the user different from the first subset of the healthcare data of the user, thereby generating a customized version of the assistant model; and send the customized version of the assistant model to second computing devices of the user for use by the software application, wherein the customized version of the assistant model comprises a prediction module configured to generate predictions based on the healthcare data of the user at the second computing devices of the user.

12. The computer program product of claim 11, wherein the summary of changes does not include any identifying information of the user and includes context data associated with the healthcare data of the user.

13. The computer program product of claim 12, wherein the program instructions are further executable to:

filter the healthcare data of the user based on predefined customization rules, thereby obtaining the second subset of the healthcare data comprising user-specific healthcare data.

14. The computer program product of claim 13, wherein the assistant model is replaced with the customized version of the assistant model and the software application performs functions based on the customized version of the assistant model.

15. The computer program product of claim 13, wherein the program instructions are further executable to replace the assistant model with the customized version of the assistant model, wherein the software application performs functions based on the customized version of the assistant model.

16. A system comprising:

a processor, a computer readable memory, one or more computer readable storage media, and program instructions collectively stored on the one or more computer readable storage media, the program instructions executable to:

obtain healthcare data of a user from a software application, the software application utilizing an assistant model that defines functions of the software application;

filter the healthcare data based on predetermined categories relevant to a general population of users, thereby extracting a first subset of the healthcare data, wherein the predetermined categories of data relevant to a general population are selected as data relevant to the general population based on healthcare parameters that are utilized by more than a predetermined percentage of the general population of users of the software application;

train a first version of the assistant model using the first subset of the healthcare data, thereby generating an updated assistant model;

generate a summary of changes including changes to the first version of the assistant model that occurred during the training;

authenticate the user with a remote federated learning server using privacy-preserving authentication and obtain a security token from the federated learning server as part of the authentication;

tag the summary of changes with the security token as metadata;

send the summary of changes to the federated learning server, wherein the federated learning server updates a general version of the assistant model based on the summary of changes and other summary of changes received from computing devices of the general population of users, thereby generating an updated general version of the assistant model;

obtain the updated general version of the assistant model from the federated learning server;

customize the updated general version of the assistant model for the user by training the updated general version of the assistant model using a second subset of the healthcare data of the user different from the first subset of the healthcare data of the user, thereby generating a customized version of the assistant model; and send the customized version of the assistant model to second computing devices of the user for use by the software application, wherein the customized version of the assistant model comprises a prediction module configured to generate predictions based on the healthcare data of the user at the second computing devices of the user.

17. The system of claim 16, wherein the program instructions are further executable to:

filter the healthcare data of the user based on predefined customization rules, thereby obtaining the second subset of the healthcare data comprising user-specific healthcare data;

wherein the customized version of the assistant model is different from the updated general version of the assistant model, and wherein the predetermined categories are different from the predefined customization rules.

18. The system of claim 17, wherein the assistant model is replaced with the customized version of the assistant model and the software application performs functions based on the customized version of the assistant model.

19. The system of claim 17, wherein the program instructions are further executable to replace the assistant model with the customized version of the assistant model, wherein the software application performs functions based on the customized version of the assistant model.

20. The system of claim 16, wherein the assistant model comprises a time-series predictive deep neural network, the summary of changes does not include any identifying information of the user, and the summary of changes includes context data associated with the healthcare data of the user.

* * * * *